Figure 1:
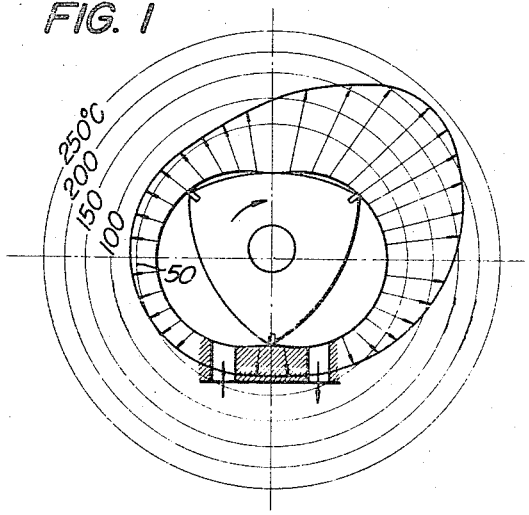

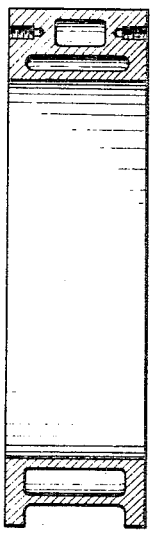
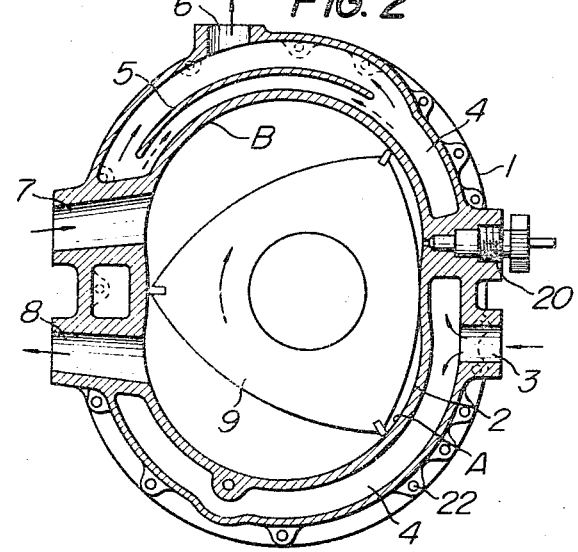
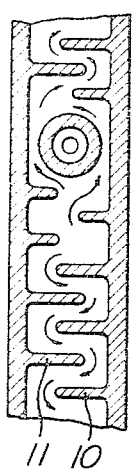
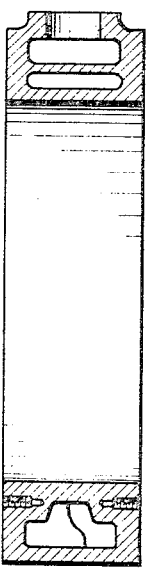
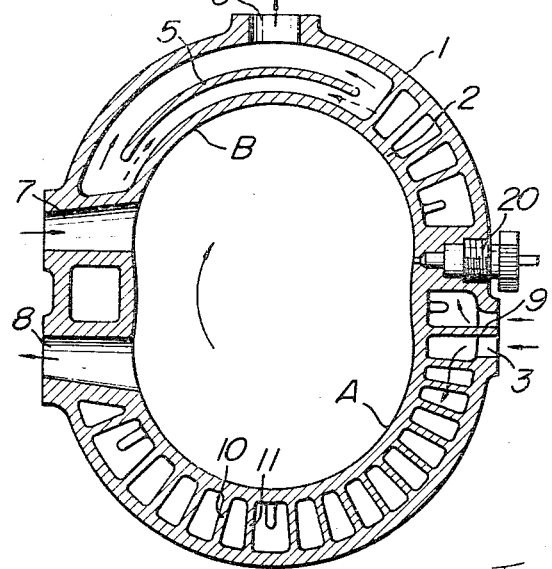

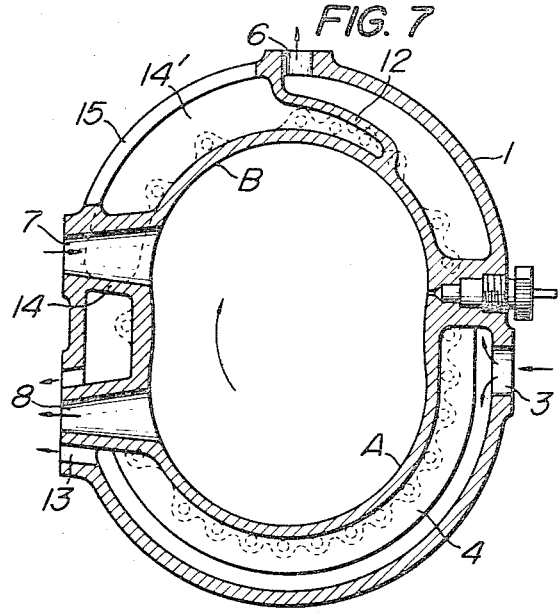
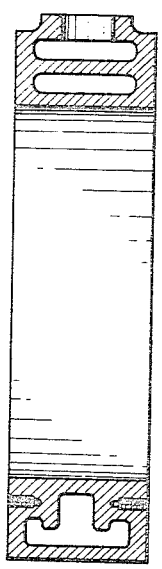
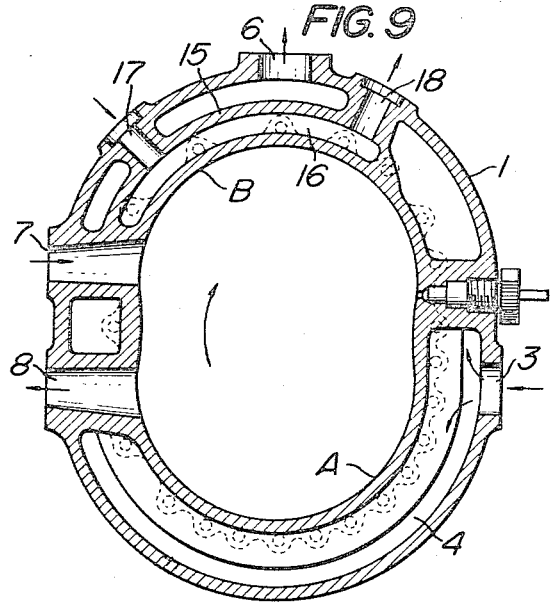

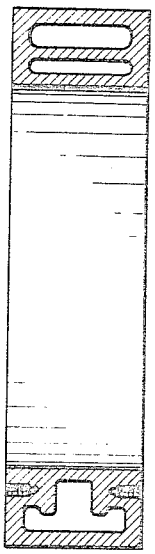
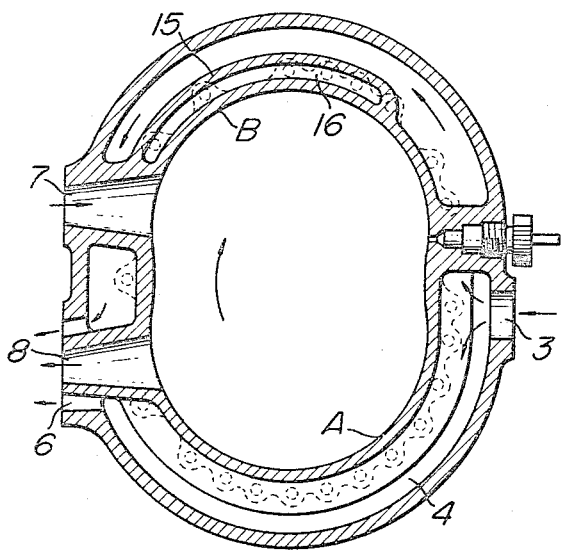
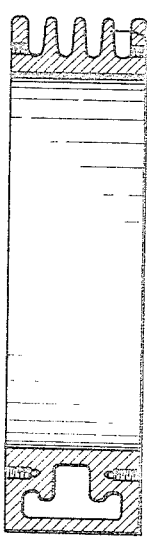
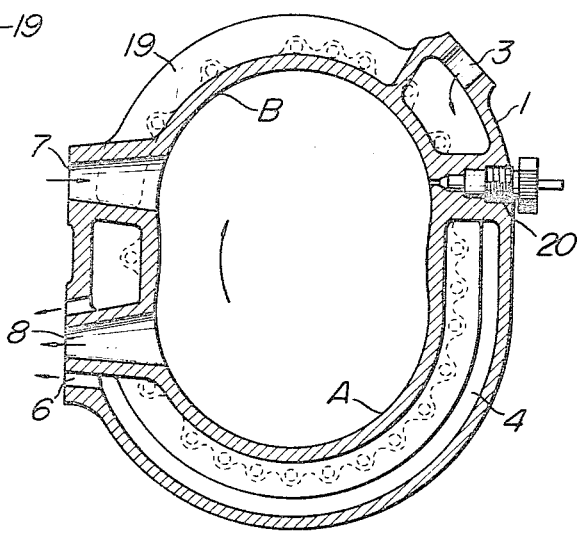

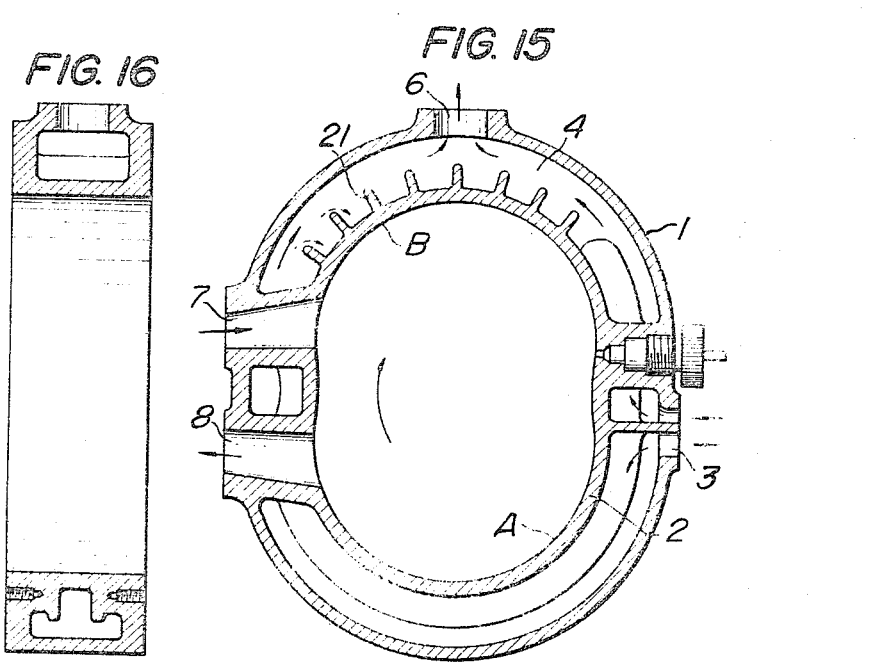

3,313,276
METHOD OF COOLING A ROTARY ENGINE
Ryusuke Ito, Amagasaki-shi, and Hiroshi Tado, Suita-shi, Japan, assignors to Yanmar Diesel Engine Co., Ltd., Osaka, Japan, a corporation of Japan
Filed Oct. 12, 1964, Ser. No. 403,130
4 Claims. (Cl. 123—8)

This invention relates to methods of cooling the center housing of a rotary engine of the type which includes a casing comprised of side covers and a center housing having a cylindrical inner sliding surface contoured in cross section as a multilobal epitrochoid with a rotor having a number of angular edges and mounted in said casing for eccentric rotation so that as the rotor rotates the volume of the space defined by the rotor, housing and side covers is cyclically subjected to compression and expansion.

The temperature of the center housing sliding wall surface of the casing constructed as described above in operation is as shown in FIG. 1; and that of the hottest area of the surface is about 240° C. while that of the coldest area is about 50° C. In this figure, the arrow on the top portion of the center housing indicates a spark plug, the arrow on the rotor the direction of its rotation, the upwardly directed arrow on the bottom portion of the housing a suction passage and the downward arrow an exhaust passage. As observed in this distribution chart, the difference between the maximum and the minimum temperature is very large, the hottest region being undercooled whereas the coldest region is overcooled. Such temperature distribution, which corresponds to an inappropriate cooled state, is caused by the fact that the operation cycle of the rotary engine is performed at all times in a limited space and that each of the engine strokes including suction, compression, combustion, expansion and exhaust is carried out at a circumferentially fixed point on the center housing. It will be apparent that the housing area where the combustion and explosion are effected tends to form a hot spot, and the suction side area tends to be overcooled if the cooling is enough to prevent the formation of such hot spot.

This invention is intended to obtain an improved temperature distribution over the inner wall surface of the engine center housing. To attain this objective, a cooling water inlet is provided according to this invention along the minor axis of the housing on its combustion chamber side where the wall temperature is highest, the cooling water being introduced through the inlet into the jacket of the center housing to flow along the wall constructed so that the cooling water flows at a sufficient rate and a sufficient cooling area is obtained fully to cool the inner wall of the hottest housing area. The low temperature portion on the suction side is formed so as to allow little or no cooling water to flow through the region, or alternatively, a flow of fluid such as lubricant oil which is of higher temperature than the cooling water is provided through the low temperature portion alone. With such arrangement, the hot portion is positively cooled while the overcooling of the cold portion is effectively precluded, that is, the temperature variation along the entire circumference of the housing wall is minimized with the highest wall temperature lowered and the lowest wall temperature raised.

Figure 17:
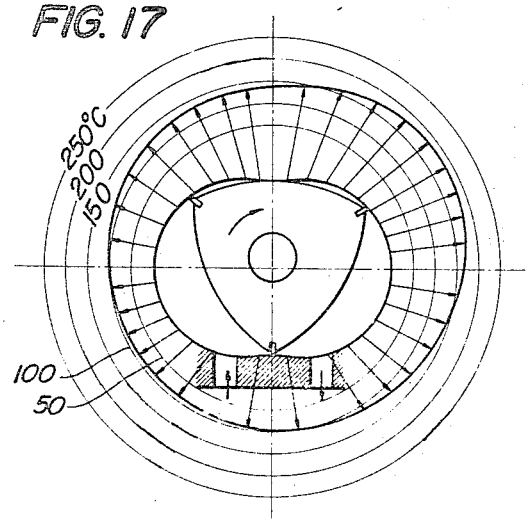

FIG. 1 is a chart illustrating the temperature distribution over the circumferential sliding surface of the center housing of a rotary engine during its operation, said engine having a cylindrical sliding surface contoured in a bilobal epitrochoid; FIGS. 2–3, 4–5, 7–8, 9–10, 11–12, 13–14 and 15–16 are transverse and longitudinal cross sections of the center housing illustrating one practical example of the invention; FIG. 6 is a development of the rib portion in FIG. 4; and FIG. 17 illustrates one example of the temperature distribution over the center housing sliding surface during operation of a rotary engine embodying the invention.

One embodiment of this invention will be described in connection with FIGS. 2 and 3. As cooling water inlet 3 is arranged in the housing 1 in the highest temperature region, and a peripherally extending partition wall 5 is formed outside of the inner wall (indicated at B) of the low temperature region so that a greater portion of the cooling water flows outside of said partition 5 and the remaining limited portion is allowed to flow inside of said partition to prevent the overcooling of the region B. It will be recognized that in this manner the high temperature region can be effectively cooled while preventing the overcooling of the low temperature portion by separating the latter from the flow of the cooling water to reduce its cooling effect upon the low temperature region. In the drawing, 6 designates a cooling water outlet, 7 a gas mixture suction port, 8 an exhaust port, 9 a rotor, 20 an ignition plug, and 22 fastening bolts for securing the side covers to the center housing.

FIGS. 4 to 6 illustrate another embodiment of the invention which includes a zigzag arrangement of ribs 10, 11 formed in the high temperature side of the water jacket portion of the center housing so as to extend parallel with the axis of the housing. Formed in the water jacket at the cooling water inlet 3 is a rib 9 to divide the flow of water into two flow portions proceeding in two directions, i.e., one flow directed to the high temperature region and the other flow directed to the low temperature region of the housing as indicated by the arrows in FIG. 6. The flow portion directed to the high temperature region can be made larger than that to the low temperature region by locating the rib 9 at an appropriate point.

The embodiment shown in FIGS. 7 and 8 is so constructed that no cooling water is allowed to pass through the low temperature housing region. As shown, cooling water outlets are provided at the very top and about the exhaust port 8 of the center housing, with walls 12, 14 provided to confine the water jacket and a window 15 formed in the outer wall of the center housing to communicate with the space 14', where no cooling water is admitted so as to avoid any overcooling.

FIGS. 9 and 10 illustrate a further embodiment of this invention in which the low temperature portion of the water jacket is divided by a partition wall 15 into two compartments including the outer one serving as a water passage and the inner one 16 serving for example as an oil passage through which a fluid such as a lubricant oil hotter than the cooling water flows to avoid the overcooling of the low temperature housing region. In these figures, 17 designates a lubricant inlet and 18 a lubricant outlet. It will be recognized that in this case the compartment 16 also serves as a lubricant cooler.

The embodiment of FIGS. 11 and 12 is an example of application to a vertical type engine such as an outboard engine. A cooling water outlet 6 is arranged adjacent to the exhaust port 8 for water cooling the exhaust pipe. A partition wall 15 is arranged in the water jacket 4 to form a cavity 16 to space the low temperature portion (indicated at B) from the flow of cooling water for the purpose of preventing any overcooling of the portion.

FIGS. 13 and 14 illustrate another application of the invention to a vertical type engine like one shown in FIGS. 11 and 12. A cooling water inlet 3 is arranged adjacent to the ignition plug 20 on its rear side with respect to the direction of rotation of the rotor (as indicated by the arrow), and a cooling water outlet 6 is arranged in the vicinity of the exhaust port 8 with cooling fins 19 formed along the peripheral wall of the low temperature region B so that the region B may be cooled by natural heat radiation and convection. With the arrangement, the overall cooling efficiency of the peripheral wall of the center housing is improved while simplifying the structure thereof.

FIGS. 15 and 16 illustrate a further embodiment of the invention as applied to a very small engine in which it is difficult because of casting limitations to form partition walls in its water jacket. In this case projections 21 formed on the housing portion B serve to restrict the flow of cooling water for the prevention of the overcooling of that portion.

FIG. 17 illustrates one example of temperature distribution over the rotor housing sliding surface of a rotary engine embodying the present invention during operation. As is observed, the temperature value of the high temperature portion is reduced while that of the low temperature portion is increased resulting in a materially reduced temperature variation as compared with the case of FIG. 1. This is very effective to avoid extraordinary wear, thermal binding, etc. and to improve sealing effect and combustion efficiency of the high temperature region of the center housing.

What is claimed is:

1. In a rotary internal combustion engine including a casing comprising side covers and a cylindrical center housing having axially disposed end surfaces and an inner sliding surface of a multi-lobal epitrochoid profile, a gas inlet port and an exhaust port, and a rotor having a number of angular edges mounted in the casing for eccentric rotation therein, a cooling means comprising a cooling fluid inlet in said center housing adjacent the highest temperature region of the inner sliding surface, cooling fluid passage means within the housing through which the cooling fluid is caused to flow in opposite circumferential directions from said cooling fluid inlet, partition means arranged on the low temperature side of said housing to prevent overcooling thereof by the passage of the cooling fluid thereabout, a plurality of ribs extending axially of the end surfaces of said center housing less than the full length thereof, said ribs being interdigitated to form a zigzag path in the high temperature region of said housing for increasing the cooling water flow rate therein while obtaining a sufficient cooling area and axial rigidity.

2. In a rotary internal combustion engine including a casing comprising side covers and a cylindrical center housing having an inner sliding surface of a multi-lobal epitrochoid profile, a gas inlet port and an exhaust port, and a rotor having a number of angular edges mounted in the casing for eccentric rotation therein, a cooling means comprising a cooling fluid inlet in said center housing adjacent the highest temperature region of the inner sliding surface and at least two cooling fluid passage means within the housing through which the cooling fluid is caused to flow in opposite circumferential directions from said cooling fluid inlet, two partition means formed in the lowest temperature region of the housing and extending in a radial direction to prevent any flow of cooling water about the lowest temperature region, said partition walls being at the ends of said cooling passage means remote from said cooling fluid inlet, two cooling fluid outlets being arranged one adjacent each of said partition walls.

3. In a rotary internal combustion engine including a casing comprising side covers and a cylindrical center housing having an inner sliding surface of a multi-lobal epitrochoid profile, a gas inlet and an exhaust port, and a rotor having a number of angular edges mounted in the casing for eccentric rotation therein, a cooling means comprising a cooling fluid inlet in said center housing adjacent the highest temperature region of the inner sliding surface and cooling fluid passage means within the housing through which the cooling fluid is caused to flow in a circumferential direction, a cooling fluid outlet in said cooling passage at a point remote from said cooling fluid inlet, partition means defining a compartment in said center housing in the lowest temperature region, inlet and outlet means for circulating a second fluid at a temperature higher than that of the cooling fluid, for example, lubricating oil, through the compartment to avoid overcooling of the lowest temperature region.

4. In a rotary internal combustion engine including a casing comprising side covers and a cylindrical center housing having an inner sliding surface of a multi-lobal epitrochoid profile, a gas inlet and an exhaust port, and a rotor having a number of angular edges mounted in the casing for eccentric rotation therein, a cooling means comprising a single cooling fluid inlet in said center housing adjacent the highest temperature region of the inner sliding surface, a single cooling fluid outlet in said housing adjacent the low temperature region, and cooling fluid passage means within the housing extending about the periphery of said inner sliding surface forming a continuous conduit therein through which the cooling fluid is caused to flow in opposite circumferential directions from said cooling fluid inlet, a circumferentially extending partition wall formed in the low temperature region of the housing and having open opposite ends directed towards the fluid passage means on opposite sides of said cooling fluid outlet so that the dynamic pressures of two cooling fluid flows passing in two opposite directions counteract each other between said partition wall and said inner sliding surface to prevent any fluid flow therethrough in the area adjacent the low temperature region.

References Cited by the Examiner

UNITED STATES PATENTS

| 2,263,275 | 11/1941 | Pieper. | |
| 3,102,516 | 9/1963 | Gist et al. | 123—8 |
| 3,286,700 | 11/1966 | Froede | 123—8 |

MARK NEWMAN, *Primary Examiner.*

F. T. SADLER, *Assistant Examiner.*